UNITED STATES PATENT OFFICE.

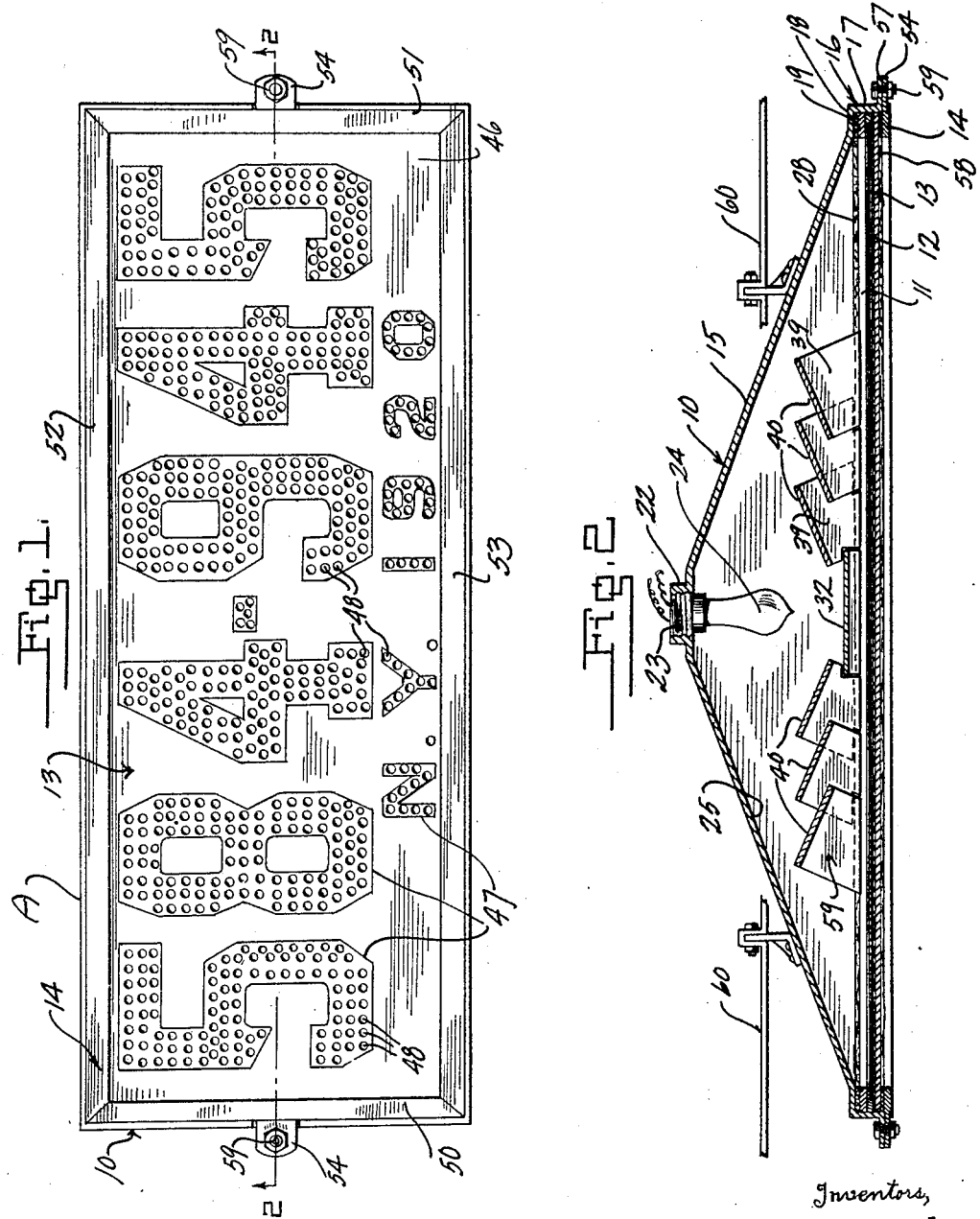

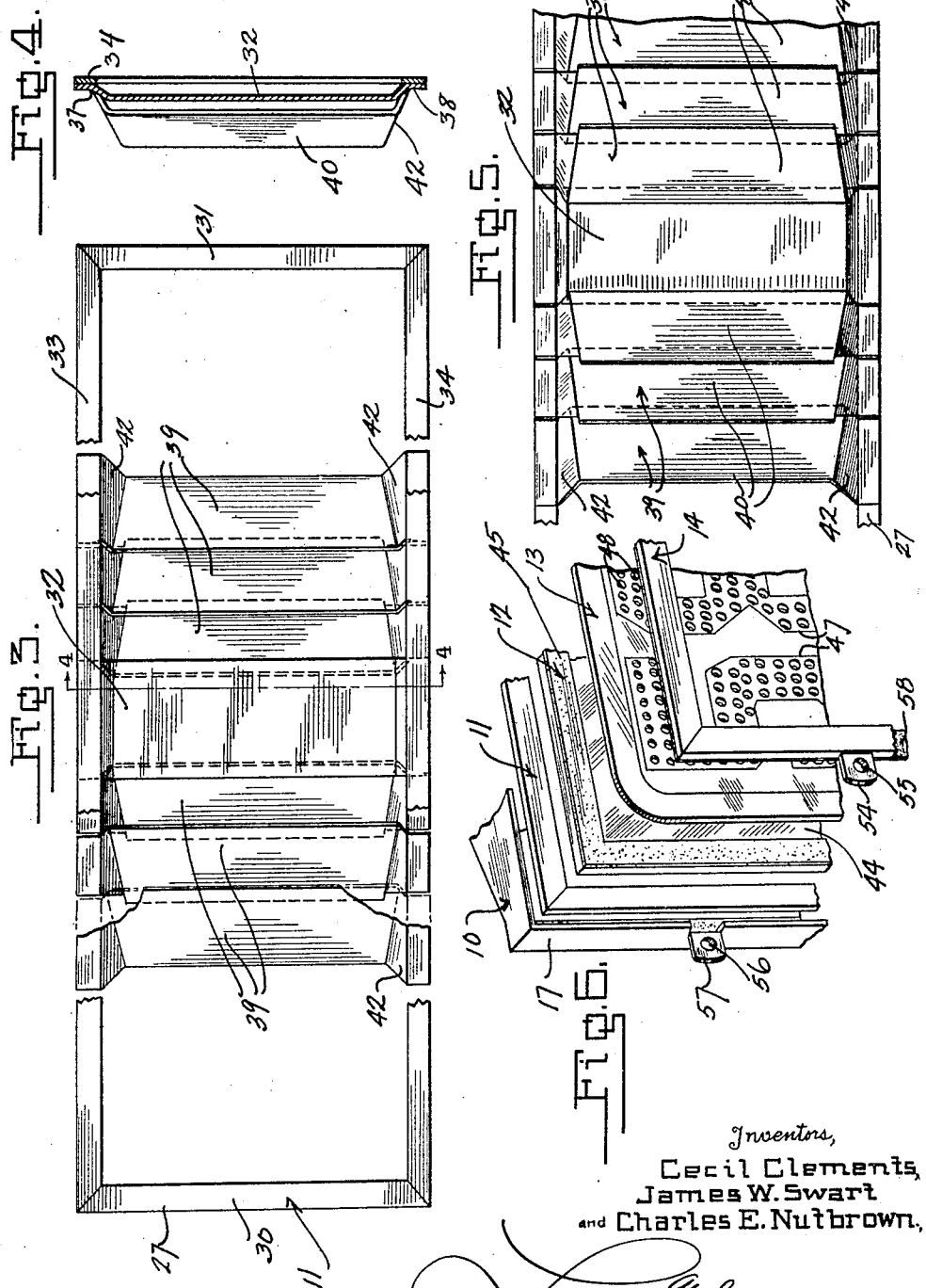

CECIL CLEMENTS, JAMES W. SWART, AND CHARLES E. NUTBROWN, OF ROCHESTER, NEW YORK.

ILLUMINATED LICENSE-PLATE HOLDER AND REFLECTOR.

1,414,772.      Specification of Letters Patent.      Patented May 2, 1922.

Application filed October 3, 1921. Serial No. 504,991.

*To all whom it may concern:*

Be it known that we, CECIL CLEMENTS, JAMES W. SWART, and CHARLES E. NUTBROWN, citizens of the United States, residing at Rochester, in the county of Monroe and State of New York, have invented certain new and useful Improvements in Illuminated License-Plate Holders and Reflectors, of which the following is a specification.

This invention relates to a license tag for vehicles and the like, having indicia thereon capable of illumination, whereby the same may be easily distinguished at relatively great distances.

The primary object of the invention is the provision of a license plate, simulating somewhat the ordinary type, and having the ordinary indicia thereon in contrasting color to the body color of the plate, said indicia having certain stencilled portions whereby said license plate may be illuminated to set said indicia in relief against the opaque portions of said plate.

A further object of the invention is the provision of a license plate holder including novel reflecting and deflecting means, whereby a stencilled tag may designate preferred indicia by means of the illuminant within said holder.

A further object of the invention is the provision of a license plate holder of novel formation, including an illuminant, and reflecting and deflecting apparatus for supporting a license plate of novel formation, in such manner that the indicia on said plate can easily be distinguished in darkness.

Other objects and advantages will be apparent during the course of the following detailed description.

In the accompanying drawings, forming a part of this specification, and in which similar reference characters designate corresponding parts throughout the several views, Figure 1 is a front elevation of the improved license plate holder and reflector.

Figure 2 is a longitudinal cross sectional view, taken on the line 2—2 of Figure 1.

Figure 3 is a front elevation of a deflecting apparatus used in the improved license plate holder showing details of construction thereof.

Figure 4 is a vertical cross sectional view through the deflector apparatus, and taken on the line 4—4 of Figure 3.

Figure 5 is a fragmentary rear elevation of the deflector illustrated in Figure 3.

Figure 6 is a fragmentary perspective view of various details of the improved illuminated license plate holder and reflector, and showing the manner in which the same may be disassembled or assembled.

In the drawings, wherein for the purpose of illustration is shown the preferred embodiment of this invention, the letter A designates the improved illuminated license plate holder and reflector, including the holder 10; deflector 11; transparent sealing plate 12; license plate 13; and retaining frame 14.

The supporting holder 10, preferably includes the reflecting plate 15, and the seating frame 16. The reflector 15 and seating frame 16 are preferably integral, and stamped from a single sheet of approved metal. The frame 16 is substantially rectangular in formation, including the marginal portion 17, and the seating flange 18; said marginal portion 17 and seating flange 18 being disposed at right angles to each other, to provide a retaining seat or pocket 19 for receiving the deflector 11, transparent plate 12, license plate 13, and retaining frame 14. The reflector 15 may be of any approved shape, the same preferably tapering outwardly and toward the center of the holder 10 from its connection with the seating flange 18. In this manner, the reflector 15 tapers or may be arcuated outwardly from the plane defined by the seating flange 18. The central point of the reflector 15 at the apex of the same, is provided with a screw threaded socket 22, adapted to receive an electric plug 23 therein, and a detachable bulb or lamp 24, which of course, extends toward the plane defined by the seating frame 16. The interior surfaces 25 of the reflector 15 are silvered, or mirrored in any approved manner, to provide a high polished reflecting surface, whereby the rays from the lamp 24 may be reflected in an intense manner.

The deflector 11 is of novel formation, including the rectangular frame 27, which may be of any approved material and arranged so that the sides thereof are flat and adapted for seating upon a rectangular piece of felt padding 18, to be disposed next to the seating flange 18 of the holder 10. The rectangular frame 27, is provided centrally of its lateral sides 30 and 31, with a deflector plate 32, extending from one longitudinal portion 33 of the frame to the other longitudinal portion 34 of the frame 27. The deflector plate 32, is so arranged on the frame 27, that the main deflecting portion of the same projects outwardly from the plane defined by the frame 27, although said portion of the frame 32 lies parallel to the plane of said frame 27. The deflector plate 32 may be connected in any approved manner to the edges 33 and 34, although it is preferred that the ends 37 and 38 of said plate 32 be inturned toward the sides 33 and 34, and soldered or otherwise connected thereto. Lateral deflecting plates 39 are disposed upon the frame 27, to the right and left of the central deflecting plate 32. These plates 39 each include a deflecting body portion 40, which is inclined toward the central plate 32, and at an acute angle to the plate defined by the body portion of said reflecting plate 32. Thus, the deflecting portions 40 of the lateral plates 39 upon one side of the plate 32 are inclined, in parallel manner, to slope toward said plate 32; and the portions 40 of lateral plates 39 upon the other side of the plate 32 incline toward the plate 32 being disposed in parallel relation to each other. It is preferred that the deflecting portions 40 of the lateral plates 39 extend outwardly from the frame 27 farther than the deflecting portion of the plate 32. In fact, the deflecting portions 40 of the two plates 39 adjacent the central plate 32, overlap the lateral edges of the plate 32, substantially as illustrated in Figure 2. Similarly, the deflecting surfaces 40 of the plate 39 nearest the central plate 32 overlaps for a short distance, its next adjacent deflecting plate 39, and for a purpose to be subsequently set forth. It is preferred that three lateral deflecting plates 39 be positioned upon each side of the central deflecting plate 32, the most remote deflecting plates 39 from the central plate 32 being spaced for a considerable distance from the lateral portions 30 and 31 of the frame 27. The ends 42 of the plates 39 are tapered or inclined in any approved manner, whereby certain flanges thereof may overlie the frame 27 and be soldered to the portions 33 and 34 thereof.

The sealing plate 12, preferably comprises the transparent pane of glass, celluloid, or the like 44, which is lined upon both sides of its marginal edges with padding 45 as a protection to the same. This plate 12 is of rectangular formation and adapted for disposition in the seating portion 16 of the holder 10, in a manner to be subsequently described.

The license plate 13 is of rectangular formation adapted for seating in the frame 16 of the holder 10, and has the face surface 46 thereof provided with the indicia 47, as is the case in ordinary license tag formation. The plate 13 is of course, of some opaque material and the face surface 46 is of one color, while the indicia 47 are inlaid thereon in another color, as is the present practice in license tag formation. The outline and body of the indicia 47 are provided with relatively small spaced apertures 48, whereby said indicia 47 are stencilled, so to speak, upon the plate 13.

The locking frame 14, is merely composed of the side strips 50 and 51, and the longitudinal top and bottom strips 52 and 53, said strips 50 to 53 inclusive being connected to form a rectangular retaining frame and having an open face. The lateral portions 50 and 51 are each provided with an outwardly projecting lug 54 having an aperture 55 therein, and adapted to align with the apertures 56 in the lugs 57, which are positioned in integral or rigid manner, projecting outwardly from the marginal portion 17 of the holder 10; and when the retaining frame 14 is locked in the seat 16, substantially as illustrated in Figure 2 of the drawing. A facing of felt 58 is provided upon the back surface of the retaining frame 14.

In assemblage, the felt padding 28 as above mentioned, is placed inside of the seating recess 19, to abut upon the seating flange 18 thereof. The deflector apparatus 11 is next positioned in the seating portion 16 of the holder 10, whereby the deflecting plates 32 and 39 thereof extend inwardly toward the reflecting surfaces 25 of the reflector 15. In this position, the central deflecting plate 32 is positioned immediately facing the lamp bulb 24, and the deflecting surfaces 40 of the lateral deflector plates 39, are inclined in such position as to receive the rays of light from the bulb 24 and deflect the same back upon the reflecting surfaces 25 of the reflector 15. The next step in assembling the device is to place the sealing transparent plate 12, whereby one marginal padded portion 45 thereof will abut the marginal frame 27 of the deflector apparatus 11. By placing this plate 12 in such position, the interior of the holder 10, as well as the parts of the deflector 11, are protected from dust, dirt, and inclement weather. The license plate 13 is next placed over the transparent plate 12, the marginal edges of the same abutting the exterior marginal padding 45 upon said plate 12, whereby the rear surface of said license plate 13 is prevented from contacting directly against the pane 44. The retaining frame 14 is next disposed to abut the marginal edges of the plate 13, and when the lugs 54 thereof are aligned, in above described manner, with the lugs 57, suitable bolt mechanism 59 can be adjusted to the apertures 55 and 56 thereof, and the various details of the improved illuminated license plate holder and reflector bolted in assembled position for use.

Suitable brackets 60 may be positioned upon the rear surface of the reflector 15 for mounting the improved license plate holder and reflector to a vehicle.

In operation, as the bulb 24 is illuminated, the rays of light from the same will directly impinge upon the deflecting surfaces of the plates 32 and 39, and whereby said rays will be deflected onto the reflecting surfaces 25 of the reflector 15. This reflecting and deflecting, of course, will provide a uniform light in the holder 10, and whereby the various rays may indirectly pass through the various holder openings in the deflector apparatus 11, to provide a light of uniform intensity throughout the length and height of the device A. The rays of the bulb 24 thus will be indirectly reflected through the perforations 48 of the indicia 47, whereby said indicia 47 will stand in relief against the opaque surface 46 of the license plate 13. In this manner, the various indicia 47 will be illuminated with uniform intensity, and will be visible at a relatively great distance.

From the foregoing, it can be seen that a device has been provided which will illuminate indicia at a much greater distance than the ordinary method of illuminating indicia upon license plates and tags.

Various changes in the shape, size and arrangement of parts, may be made to the form of the invention herein shown and described, without departing from the spirit of the invention or the scope of the claims.

We claim:

1. As an article of manufacture, a deflector device comprising a substantially rectangular frame having a central deflecting plate transversely thereof and flat deflecting plates on each side of said central deflecting plate inclined toward said central deflecting plate.

2. As an article of manufacture, a deflecting device, comprising a substantially rectangular frame having a central deflecting plate transversely mounted thereon and in parallel plane therewith, and lateral deflecting plates mounted transversely the length of said frame and at acute angles to the plane of said central deflecting plate.

3. As an article of manufacture, a deflector device, comprising a substantially rectangular frame having a deflector plate fixed centrally of its length and extending transversely of said frame in a plane parallel with the plane of said frame and spaced therefrom, and lateral deflecting plates on each side of said central deflecting plate and affixed transversely to said frame to incline toward said central deflecting plate.

4. As an article of manufacture, a deflecting device including a substantially rectangular frame having a deflecting plate centrally mounted of its longitudinal ends to project outwardly in a plane parallel with the frame of said plane, a plurality of deflecting plates on each side of said central deflecting plates, and spaced from the longitudinal end of said frame, whereby adjacent edges of said lateral deflecting plates overlie the adjacent marginal edges of each other and the adjacent marginal edges of said central deflecting plate, said lateral deflecting plates being inclined in parallel relation to each other at an acute angle to the plane defined by the central deflecting plate.

5. In a device of the class described, the combination of a supporting frame including a rearwardly tapering reflecting plate, a deflecting device including a frame and a plurality of deflecting plates having their deflecting surfaces inclined at an angle to said frame, a transparent plate, a stencilled plate of opaque material, and locking means for receiving said deflecting device, transparent plate, and stencil plate, in the order named, in said supporting frame.

6. A device of the class described comprising a supporting frame including a rectangular shaped seating depression having apertured locking lugs thereon, a reflecting plate tapering outwardly from the plane defined by said frame and having a socket aperture in the apex thereof, an electric lamp detachably mounted in said socket, a deflector in said seating depression of said supporting frame, a sealing transparent plate, a license plate having stencilled indicia thereon, and locking means for retaining said deflector, sealing plate, and license plate mounted in the seating depression of said supporting frame, said locking means cooperating with the apertured lugs on said supporting frame.

7. A device of the class described comprising a reflector casing having an opening therein, illuminant disposed within said casing, a deflector mounted in the opening of said casing and including a central deflecting plate having lateral deflecting plates inclined toward said central deflecting plate, and whereby the rays from said illuminant will be prevented from direct passage through said opening, and an indicia bearing plate mounted in said opening forwardly of said deflector.

8. A device of the class described comprising a supporting casing including a reflecting surface, illuminating means disposed in said reflecting surface of the casing, a deflector mounted over an opening in said casing, said deflector including a central deflecting plate having a plurality of acutely inclined plates mounted laterally thereof, a transparent plate disposed forwardly of said deflector plate, and indicia bearing plate disposed forwardly of said transparent plate, and means for locking said plates in the opening of said frame.

9. A device of the class described comprising a supporting casing including a rearwardly tapered reflecting surface having a socket disposed centrally thereof and having a forward opening therein, illuminating means disposed in the socket in said reflecting casing, and deflector frames disposed in the opening of said reflector casing, said deflector including a central deflector plate extending transversely of the length of said deflector frame and including a plurality of overlapping lateral deflecting plates inclined at an acute angle rearwardly of the central deflecting plate and whereby rays will be permitted to indirectly filter through said deflecting frame for passage through the opening in said reflector casing, a transparent indicia bearing plate disposed in said opening forwardly of said frame, and means detachably mounting said deflector frame and indicia bearing plate in said reflector casing opening.

CECIL CLEMENTS.
JAMES W. SWART.
CHARLES E. NUTBROWN.